(12) United States Patent
Rappl et al.

(10) Patent No.: US 10,076,809 B2
(45) Date of Patent: Sep. 18, 2018

(54) VOLTAGE SENSING WIRE FEEDER WITH WELD PROCEDURE MEMORIES

(71) Applicant: Illinois Tool Works Inc., Glenview, IL (US)

(72) Inventors: James Francis Rappl, Neenah, WI (US); Jeffrey Ray Ihde, Greenville, WI (US); Joseph Edward Feldhausen, Appleton, WI (US); Timothy Jay Reitmeyer, Appleton, WI (US); Thomas Don Lahti, Appleton, WI (US); Clay Alan Byron, Mobile, AL (US); Michael Hilary Novak, Virginia Beach, VA (US)

(73) Assignee: Illinois Tool Works Inc., Glenview, IL (US)

( * ) Notice: Subject to any disclaimer, the term of this patent is extended or adjusted under 35 U.S.C. 154(b) by 218 days.

(21) Appl. No.: 13/799,367

(22) Filed: Mar. 13, 2013

(65) Prior Publication Data

US 2014/0263256 A1     Sep. 18, 2014

(51) Int. Cl.
| | |
|---|---|
| *B23K 37/02* | (2006.01) |
| *B23K 9/095* | (2006.01) |
| *B23K 9/10* | (2006.01) |
| *B23K 9/12* | (2006.01) |

(52) U.S. Cl.
CPC ........ *B23K 37/0247* (2013.01); *B23K 9/0953* (2013.01); *B23K 9/1087* (2013.01); *B23K 9/124* (2013.01)

(58) Field of Classification Search
CPC .. B23K 37/0247; B23K 9/124; B23K 9/1087; B23K 9/0953
See application file for complete search history.

(56) References Cited

U.S. PATENT DOCUMENTS

| | | | |
|---|---|---|---|
| 2,043,331 A | 6/1936 | Notvest | |
| 2,175,891 A | 10/1939 | Graham | |
| 2,526,597 A | 10/1950 | Winslow | |
| 2,617,913 A | 11/1952 | Oestreicher | |
| 2,642,515 A | 6/1953 | Bagg | |
| 3,496,328 A | 2/1970 | Moerke | |
| 3,992,565 A | 11/1976 | Gatfield | |

(Continued)

FOREIGN PATENT DOCUMENTS

| | | |
|---|---|---|
| EP | 0575082 | 12/1993 |
| EP | 1586403 | 10/2005 |

(Continued)

OTHER PUBLICATIONS http://www.lincolnelectric.com/assets/en_US/Products/K2613-2/e8105.pdf.

(Continued)

*Primary Examiner* — Thien S Tran
(74) *Attorney, Agent, or Firm* — McAndrews, Held & Malloy, Ltd.

(57) ABSTRACT

A voltage sensing wire feeder includes a storage device and a user interface. The user interface is configured to receive a first selection and a second selection. The first selection is configured to direct the voltage sensing wire feeder to use a first group of settings stored in the storage device, and the second selection is configured to direct the voltage sensing wire feeder to use a second group of settings stored in the storage device.

21 Claims, 3 Drawing Sheets

(56) References Cited

U.S. PATENT DOCUMENTS

| | | |
|---|---|---|
| 4,051,344 A | 9/1977 | Robbins |
| 4,079,231 A | 3/1978 | Toth |
| 4,147,919 A | 4/1979 | Matasovic |
| 4,216,367 A | 8/1980 | Risberg |
| 4,216,368 A | 8/1980 | Delay |
| 4,227,066 A | 10/1980 | Bulwidas |
| 4,247,752 A | 1/1981 | Stringer |
| 4,266,114 A | 5/1981 | Hansen |
| 4,410,789 A | 10/1983 | Story |
| 4,450,340 A | 5/1984 | Corrigall |
| 4,467,174 A | 8/1984 | Gilliland |
| 4,508,954 A | 4/1985 | Kroll |
| 4,521,672 A | 6/1985 | Fronius |
| 4,531,045 A | 7/1985 | Kemp |
| 4,561,059 A | 12/1985 | Davis |
| 4,584,685 A | 4/1986 | Gajjar |
| 4,608,482 A | 8/1986 | Cox |
| 4,641,292 A | 2/1987 | Tunnell |
| 4,767,908 A | 8/1988 | Dallavalle |
| 4,769,754 A | 9/1988 | Reynolds |
| 4,918,517 A | 4/1990 | Burgoon |
| 4,973,821 A | 11/1990 | Martin |
| 5,039,835 A | 8/1991 | Schwiete |
| 5,043,557 A | 8/1991 | Tabata |
| 5,063,282 A | 11/1991 | Gilliland |
| 5,276,305 A | 1/1994 | Hsien |
| 5,376,894 A | 12/1994 | Petranovich |
| 5,406,050 A | 4/1995 | Macomber |
| 5,653,902 A | 8/1997 | Chang |
| 5,834,916 A | 11/1998 | Shimogama |
| 5,982,253 A | 11/1999 | Perrin |
| 6,040,555 A | 3/2000 | Tiller |
| 6,066,832 A * | 5/2000 | Uecker .................. B23K 9/095 219/130.31 |
| 6,091,048 A | 7/2000 | Lanouette |
| 6,103,994 A * | 8/2000 | Decoster ............. B23K 9/0953 219/130.5 |
| 6,156,999 A | 12/2000 | Ignatchenko |
| 6,166,506 A | 12/2000 | Pratt |
| 6,225,596 B1 | 5/2001 | Chandler |
| 6,423,936 B1 | 7/2002 | Reed |
| 6,458,157 B1 | 10/2002 | Suaning |
| 6,479,791 B1 | 11/2002 | Kowaleski |
| 6,479,795 B1 | 11/2002 | Albrecht |
| 6,570,132 B1 | 5/2003 | Brunner |
| 6,624,388 B1 | 9/2003 | Blankenship |
| 6,627,849 B2 | 9/2003 | Ihde |
| 6,653,597 B2 | 11/2003 | Baum |
| 6,781,095 B2 | 8/2004 | Hayes |
| 6,818,860 B1 | 11/2004 | Stava |
| 6,906,285 B2 | 6/2005 | Zucker |
| 6,909,285 B2 | 6/2005 | Jordan |
| 7,205,503 B2 | 4/2007 | Reynolds |
| 8,345,819 B2 | 1/2013 | Mastronardi |
| 2001/0043656 A1 | 11/2001 | Koslar |
| 2003/0089693 A1 | 5/2003 | Hayes |
| 2004/0199846 A1 | 10/2004 | Matsumoto |
| 2005/0087523 A1 | 4/2005 | Zucker |
| 2005/0199605 A1 | 9/2005 | Furman |
| 2006/0027546 A1 | 2/2006 | Reynolds |
| 2006/0076335 A1 | 4/2006 | Reynolds |
| 2006/0086706 A1 | 4/2006 | Ulrich |
| 2006/0138113 A1 | 6/2006 | Ott |
| 2006/0213892 A1 | 9/2006 | Ott |
| 2007/0080154 A1 | 4/2007 | Ott |
| 2008/0011730 A1 * | 1/2008 | Enyedy .................. B23K 9/323 219/137.9 |
| 2010/0108654 A1 * | 5/2010 | Ulrich .................. B23K 9/0953 219/130.5 |
| 2011/0049116 A1 * | 3/2011 | Rappl .................. B23K 9/1087 219/132 |
| 2011/0073569 A1 | 3/2011 | Rappl |
| 2011/0240620 A1 | 10/2011 | Ott |
| 2011/0247999 A1 * | 10/2011 | Ihde ...................... B23K 9/323 219/74 |
| 2012/0097644 A1 | 4/2012 | Ott |
| 2012/0241428 A1 * | 9/2012 | Kowaleski ........... B23K 9/1006 219/130.1 |
| 2013/0264319 A1 * | 10/2013 | Temby .................. B23K 9/095 219/130.1 |
| 2013/0319987 A1 * | 12/2013 | Beistle ................. B23K 9/1087 219/132 |
| 2014/0061169 A1 * | 3/2014 | Sammons ............ B23K 9/1006 219/109 |

FOREIGN PATENT DOCUMENTS

| | | |
|---|---|---|
| JP | 61137675 | 6/1986 |
| JP | 162966 | 6/1992 |
| JP | 04162964 | 6/1992 |
| JP | 4162964 | 6/1992 |
| JP | 04162966 | 6/1992 |
| JP | 05104248 | 2/1993 |
| JP | 2003088957 | 3/2003 |
| JP | 2003154455 | 5/2003 |
| JP | 2003191075 | 7/2003 |
| JP | 2003236663 | 8/2003 |
| WO | 2011028313 | 3/2011 |
| WO | 2011041037 | 4/2011 |
| WO | 2012058164 | 5/2012 |

OTHER PUBLICATIONS http://www.lincolnelectric.com/assets/US/EN/literature/E8271.pdf.
International Search Report from PCT application No. PCT/US2014/017503, dated Aug. 4, 2014, 9 pgs.
Echelon, "PL 3120 / PL 3150 Power Line Smart Transceiver Data Book," Version 2, 005-0154-01C.
Hackl et al, "Digitally Controlled GMA Power Sources," Fronius, www.fronius.com/worldwide/usa/products/paper_digitally_controlld_power_sources_gb.pdf, pp. 1-7, publication date not provided.
Intellon, "CEBus Power Line Encoding and Signaling," White Paper #0027, Mar. 1997, Version 0.1, pp. 1-6.
International Search Report from PCT application No. PCT/US2013/043929 dated Oct. 22, 2013, 12 pgs.
Canadian Office Action Appln No. 2,891,518 dated Feb. 26, 2018 (4 pgs).

* cited by examiner

VOLTAGE SENSING WIRE FEEDER WITH WELD PROCEDURE MEMORIES

BACKGROUND

The invention relates generally to welding systems, and, more particularly, to a voltage sensing wire feeder with weld procedure memories.

Welding is a process that has become increasingly prevalent in various industries and applications. Such processes may be automated in certain contexts, although a large number of applications continue to exist for manual welding applications. In both cases, such welding applications rely on a variety of types of equipment to ensure that the supply of welding consumables (e.g., wire, shielding gas, etc.) is provided to the weld in an appropriate amount at the desired time. For example, metal inert gas (MIG) welding typically relies on a wire feeder to enable a welding wire to reach a welding torch. The wire is continuously fed during welding to provide filler metal. A power source ensures that arc heating is available to melt the filler metal and the underlying base metal.

Voltage sensing wire feeders are a type of wire feeder powered using welding power provided from a welding power source, thereby obviating the use of a separate cable to power the voltage sensing wire feeder. Thus, the number of cables extending between the voltage sensing wire feeder and the welding power supply may be less than systems that use a wire feeder that is not a voltage sensing wire feeder. In a system having a wire feeder that is not voltage sensing, the cable powering the wire feeder may include multiple isolated conductive lines to carry data between the wire feeder and the welding power supply. Furthermore, a non-voltage sensing wire feeder (e.g., constant speed wire feeder) may include processes and/or features that operate based on communication between the wire feeder and the welding power supply. Accordingly, while voltage sensing wire feeders obviate the use of a separate cable between the voltage sensing wire feeder and the welding power supply, voltage sensing wire feeders may typically be unable to communicate with the welding power supply.

BRIEF DESCRIPTION

In one embodiment, a voltage sensing wire feeder includes a storage device and a user interface configured to receive a first selection and a second selection. The first selection is configured to direct the voltage sensing wire feeder to use a first group of settings stored in the storage device, and the second selection is configured to direct the voltage sensing wire feeder to use a second group of settings stored in the storage device.

In another embodiment, a method includes receiving a selection, at a voltage sensing wire feeder, of a group of settings from multiple groups of settings stored in a storage device of the voltage sensing wire feeder. The method also includes controlling a welding application using data from the selected group of settings. The method includes communicating between a welding power supply and the voltage sensing wire feeder to coordinate control of the welding application.

In another embodiment, a welding system includes a welding power supply configured to provide welding power for a welding application. The welding system also includes a weld cable and a voltage sensing wire feeder having multiple groups of settings stored in a storage device of the voltage sensing wire feeder. The voltage sensing wire feeder is configured to receive the welding power from the welding power supply over the weld cable, and to communicate with the welding power supply over the weld cable. Each of the groups of settings depend at least partly on communication between the voltage sensing wire feeder and the welding power supply.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
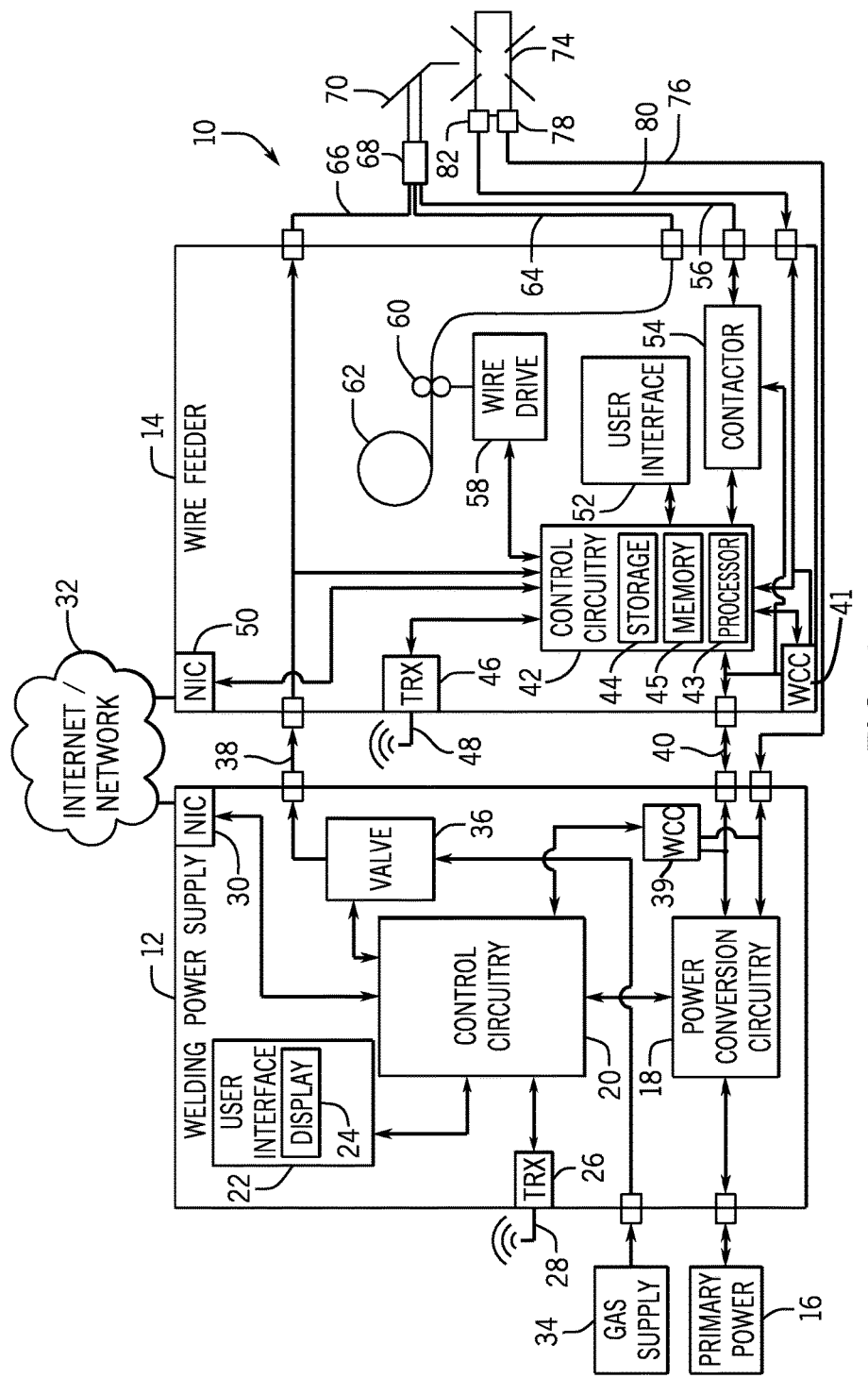
FIG. 1 is a block diagram of an embodiment of a welding system employing devices that enable communication between a welding power supply and a voltage sensing wire feeder, in accordance with aspects of the present disclosure.

Turning now to the drawings, FIG. 1 is a block diagram of an embodiment of a welding system 10 employing devices that enable communication between a welding power supply and a voltage sensing wire feeder. In the illustrated embodiment, the welding system 10 is a metal inert gas (MIG) welding system, although the present techniques may be used on other welding systems, such as other gas metal arc welding (GMAW) systems, and so forth. The welding system 10 powers, controls, and supplies consumables to a welding application. The welding system 10 includes a welding power supply 12 and a voltage sensing wire feeder 14 (e.g., not a constant speed wire feeder).

The welding power supply 12 receives primary power 16 (e.g., from the AC power grid, an engine/generator set, a battery, or other energy generating or storage devices, or a combination thereof), conditions the primary power, and provides an output power to one or more welding devices in accordance with demands of the system 10. The primary power 16 may be supplied from an offsite location (i.e., the primary power may originate from the power grid). Accordingly, the welding power supply 12 includes power conversion circuitry 18 that may include circuit elements such as transformers, rectifiers, switches, and so forth, capable of converting the AC input power to AC or DC output power as dictated by the demands of the system 10 (e.g., particular welding processes and regimes). Such circuits are generally known in the art.

In some embodiments, the power conversion circuitry 18 may be configured to convert the primary power 16 to both weld and auxiliary power outputs. However, in other embodiments, the power conversion circuitry 18 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 20 to control the operation of the welding power supply 12. The welding power supply 12 also includes a user interface 22. The control circuitry 20 may receive input from the user interface 22 through which a user may choose a process and input desired parameters (e.g., voltages, currents, particular pulsed or non-pulsed welding regimes, and so forth). The user interface 22 may receive inputs using any input device, such as via a keypad, keyboard, buttons, touch screen, voice activation system, wireless device, etc. Furthermore, the control circuitry 20 may control parameters input by the user as well as any other parameters. Specifically, the user interface 22 may include a display 24 for presenting, showing, or indicating, information to an operator. The control circuitry 20 may also include interface circuitry for communicating data to other devices in the system 10, such as the voltage sensing wire feeder 14. The welding power supply 12 includes a transceiver 26 for wirelessly communicating 28 with other welding devices. In the illustrated embodiments, the welding power supply 12 may communicate with other welding devices using a wired connection, such as by using a network interface controller (NIC) 30 to communicate data via a network 32 (e.g., the Internet).

A gas supply 34 provides shielding gases, such as argon, helium, carbon dioxide, and so forth, depending upon the welding application. The shielding gas flows to a valve 36, which controls the flow of gas, and if desired, may be selected to allow for modulating or regulating the amount of gas supplied to a welding application. The valve 36 may be opened, closed, or otherwise operated by the control circuitry 20 to enable, inhibit, or control gas flow through the valve 36. For example, when the valve 36 is closed, shielding gas may be inhibited from flowing through the valve 36. Conversely, when the valve 36 is opened, shielding gas may be enabled to flow through the valve 36. In certain embodiments, the welding system 10 may control the valve 36 such that data is communicated from the welding power supply 12 to the voltage sensing wire feeder 14 using data encoded within gas flow fluctuations (e.g., via gas pulses within the flow of gas). Shielding gas exits the valve 36 and flows through a cable or hose 38 (which in some implementations may be packaged with the welding power output) to the voltage sensing wire feeder 14 which provides the shielding gas to the welding application. As may be appreciated, certain embodiments of the welding system 10 may not include the gas supply 34, the valve 36, and/or the hose 38.

Welding power flows through a cable 40 to the voltage sensing wire feeder 14. The voltage sensing wire feeder 14 uses the welding power to power the various components in the voltage sensing wire feeder 14, such as to power control circuitry 42. The welding power supply 12 may also communicate with the voltage sensing wire feeder 14 using the cable 40. For example, the welding power supply 12 and/or the voltage sensing wire feeder 14 may use weld cable communication (WCC) in which data is provided over the welding power such that welding power and data are provided together using a single conductor. Accordingly, the welding power supply 12 includes WCC circuitry 39, and the wire feeder 14 includes WCC circuitry 41 to facilitate communication using WCC between the welding power supply 12 and the wire feeder 14. Thus, using a single cable 40, welding power may be provided from the welding power supply 12 to the voltage sensing wire feeder 14, and the welding power supply 12 may communicate with the voltage sensing wire feeder 14.

The control circuitry 42 controls the operations of the voltage sensing wire feeder 14. The control circuitry 42 includes at least one controller or processor 43 that controls the operations of the voltage sensing wire feeder 14, and may be configured to receive and process multiple inputs regarding the performance and demands of the system 10. Furthermore, the processor 43 may include one or more microprocessors, such as one or more "general-purpose" microprocessors, one or more special-purpose microprocessors and/or ASICS, or some combination thereof. For example, the processor 43 may include one or more reduced instruction set (RISC) processors.

The control circuitry 42 may include a storage device 44 and a memory device 45. The storage device 44 (e.g., nonvolatile storage) may include ROM, flash memory, a hard drive, or any other suitable optical, magnetic, or solid-state storage medium, or a combination thereof. The storage device 44 may store data (e.g., data corresponding to a welding application, one or more weld procedure memories, etc.), instructions (e.g., software or firmware to perform welding processes), and any other suitable data. As may be appreciated, data that corresponds to a welding application may include the attitude (e.g., orientation) of a welding torch, a distance between the contact tip and a workpiece, a voltage, a current, welding device settings, and so forth.

As used herein "weld procedure memory" refers to a group of settings corresponding to a selectable input. The group of settings is stored in the storage device 44 and/or memory device 45 of the voltage sensing wire feeder 14, and may be collectively retrieved from the storage device 44 and/or the memory device 45 upon selection of the selectable input. Moreover, "weld procedure memories" refers to more than one "weld procedure memory" or, in other words, multiple groups of settings that respectively correspond to a selectable input. For example, the voltage sensing wire feeder 14 may include a first selectable input configured to retrieve a first group of settings corresponding to the first selectable input upon selection of the first selectable input. In addition, the voltage sensing wire feeder 14 may include a second selectable input configured to retrieve a second group of settings corresponding to the second selectable input upon selection of the second selectable input. The group of settings may include a wire feed speed, a power supply voltage setting, a power supply current setting, a power supply type setting, a power supply configuration setting, a power supply model, power supply information, a system configuration setting, a gas type, a wire size, a wire feed speed, an arc control setting, a welding process setting, a welding sequence, and any other suitable welding setting, configuration, parameter, and so forth.

The memory device 45 may include a volatile memory, such as random access memory (RAM), and/or a nonvolatile memory, such as read-only memory (ROM). The memory device 45 may store a variety of information and may be used for various purposes. For example, the memory device 45 may store processor-executable instructions (e.g., firmware or software) for the processor 43 to execute. In addition, a variety of control regimes for various welding processes, along with associated settings and parameters may be stored in the storage device 44 and/or memory device 45, along with code configured to provide a specific output (e.g., initiate wire feed, enable gas flow, capture welding current data, detect short circuit parameters, determine amount of spatter, etc.) during operation.

In certain embodiments, the voltage sensing wire feeder 14 also includes a transceiver 46 for wirelessly communicating 48 with the welding power supply 12, or another device (e.g., either directly or through a network). In certain embodiments, the transceiver 46 may be a Bluetooth device configured to communicate wirelessly with other devices. In certain embodiments, the transceiver 46 may be used to transmit and/or receive weld procedure memories to and/or from another device for archival, storage, and so forth. Moreover, the transceiver 46 may be used to transmit and/or receive data logs, error codes, error information, or any other suitable data. In the illustrated embodiment, the voltage sensing wire feeder 14 may communicate with other welding devices using a wired connection, such as by using a NIC 50 to communicate data via the network 32. Moreover, the voltage sensing wire feeder 14 may communicate via the network 32 using a wireless connection.

The voltage sensing wire feeder 14 includes a user interface 52. The control circuitry 42 may receive input from the user interface 52, such as via methods and devices described in relation to the user interface 22. Moreover, the user interface 52 may include one or more buttons, touch screens, switches, etc. for enabling an operator to select one of the weld procedure memories. Furthermore, the control circuitry 42 may display information (e.g., on a display of the user interface 52) to an operator, such as voltage, current, wire speed, wire type, and so forth. A contactor 54 (e.g., high amperage relay) is controlled by the control circuitry 42 and configured to enable or inhibit welding power to flow to a weld power cable 56 for the welding application. In certain embodiments, the contactor 54 may be an electromechanical device, while in other embodiments the contactor 54 may be any other suitable device, such as a solid state device. The voltage sensing wire feeder 14 includes a wire drive 58 that receives control signals from the control circuit 42 to drive rollers 60 that rotate to pull wire off a spool 62 of wire. The wire is provided to the welding application through a cable 64. Likewise, the voltage sensing wire feeder 14 may provide shielding gas through a cable 66. As may be appreciated, the cables 56, 64, and 66 may be bundled together with a coupling device 68.

A torch 70 delivers the wire, welding power, and shielding gas for a welding application. The torch 70 is used to establish a welding arc between the torch 70 and a workpiece 74. A work cable 76, which may be terminated with a clamp 78 (or another power connecting device), couples the welding power supply 12 to the workpiece 74 to complete a welding power circuit. As illustrated, a voltage sense cable 80 is coupled from the voltage sensing wire feeder 14 to the workpiece 74 using a sense clamp 82 (or another power connecting mechanism). Accordingly, the voltage sensing wire feeder 14 is connected to the welding power supply 12 so that it may operate even when a welding arc is not formed by the torch 70. Specifically, the voltage sensing wire feeder 14 receives welding power from the welding power supply 12 through cable 40. The welding power is connected to the various components in the voltage sensing wire feeder 14 (e.g., control circuitry 42, wire drive 58, user interface 52). A return path for the voltage sensing wire feeder 14 power is formed using the voltage sense cable 80 with the sense clamp 82 connected to the workpiece 74. Further, the work cable 76 with the work clamp 78 provide the final portion of the return path to the welding power supply 12. Thus, the return path includes the cable 80, the workpiece 74, and the cable 76. As may be appreciated, welding power may flow in either direction through the conductive path formed by cables 40, 56, and 76.

Generally, wire feeders are either constant speed wire feeders (e.g., wire feeders powered using a substantially non-changing DC voltage or an AC voltage provided over a dedicated power/control cable, such as a 14-conductor cable with two conductors providing power and the remaining conductors providing control signals), or voltage sensing wire feeders (e.g., wire feeders powered using welding power provided over a weld cable). A voltage sensing wire feeder may be powered by either a constant voltage (CV), a constant current (CC), an AC, or a DC welding power supply. With a voltage sensing wire feeder and CV power source, voltage is set at the power source while wire feed speed (amperage) is set at the voltage sensing wire feeder.

As described above, typically, a voltage sensing wire feeder does not include the ability to communicate with the welding power supply 12 because the voltage sensing wire feeder is powered using the cable 40 (except systems in which an additional cable extends between the welding power supply 12 and the wire feeder—in systems that have such an additional cable, the communication between the welding power supply 12 and the wire feeder is often limited by the number of conductors in the additional cable, e.g., 14 conductors in a 14-conductor cable). However, as described herein, the voltage sensing wire feeder 14 may communicate with the welding power supply 12 in a variety of ways without using an additional cable extending between the welding power supply 12 and the voltage sensing wire feeder 14 (and the communication may be advanced over systems that use a dedicated communication cable because the communication described herein does not limit the type or quantity of data communicated). For example, the welding power supply 12 and the voltage sensing wire feeder 14 may communicate using WCC by providing welding power and data together over the welding power cable 40. As another example, the welding power supply 12 and the voltage sensing wire feeder 14 may communicate wirelessly using the transceivers 26 and 46. Furthermore, the welding power supply 12 and the voltage sensing wire feeder 14 may communicate together via a connection to the network 32 (e.g., via the Internet). Moreover, the welding power supply 12 may communicate with the voltage sensing wire feeder 14 using a flow of gas through the gas hose 38 (e.g., via gas pulses within the flow of gas). Each of these communication methods do not use a cable extending between the welding power supply 12 and the voltage sensing wire feeder 14 (except the welding power cable 40 and the hose 38).

Accordingly, typical voltage sensing wire feeders are not capable of, and do not include, weld procedure memories, at least partly because typical voltage sensing wire feeders do not have suitable means that enable communication between the welding power supply 12 and the voltage sensing wire feeders. In contrast, the voltage sensing wire feeder 14 includes selectable weld procedure memories and facilitates communication between the welding power supply 12 and the voltage sensing wire feeder 14 for using the weld procedure memories. For example, a weld procedure memory may include a power supply voltage setting. As such, when the weld procedure memory is selected, the voltage sensing wire feeder 14 may provide the power supply voltage setting to the welding power supply 12. As another example, a weld procedure memory may include data corresponding to a process (e.g., flux-cored arc welding (FCAW) no shielding gas, MIG with shielding gas, FACAW with shielding gas, pulsed MIG, stick 6010, stick 7108, lift arc TIG, scratch start TIG, air carbon arc gouging (ACAG), remote lift arc TIG, etc.) or sequence (e.g., pre-flow, run-in, arc strike, weld, crater, burnback, post-flow, etc.) in which the welding power supply 12 and the voltage sensing wire feeder 14 work together. The data corresponding to the process may include one or more voltage setting, current setting, wire speed, time, and so forth.

Figure 2:
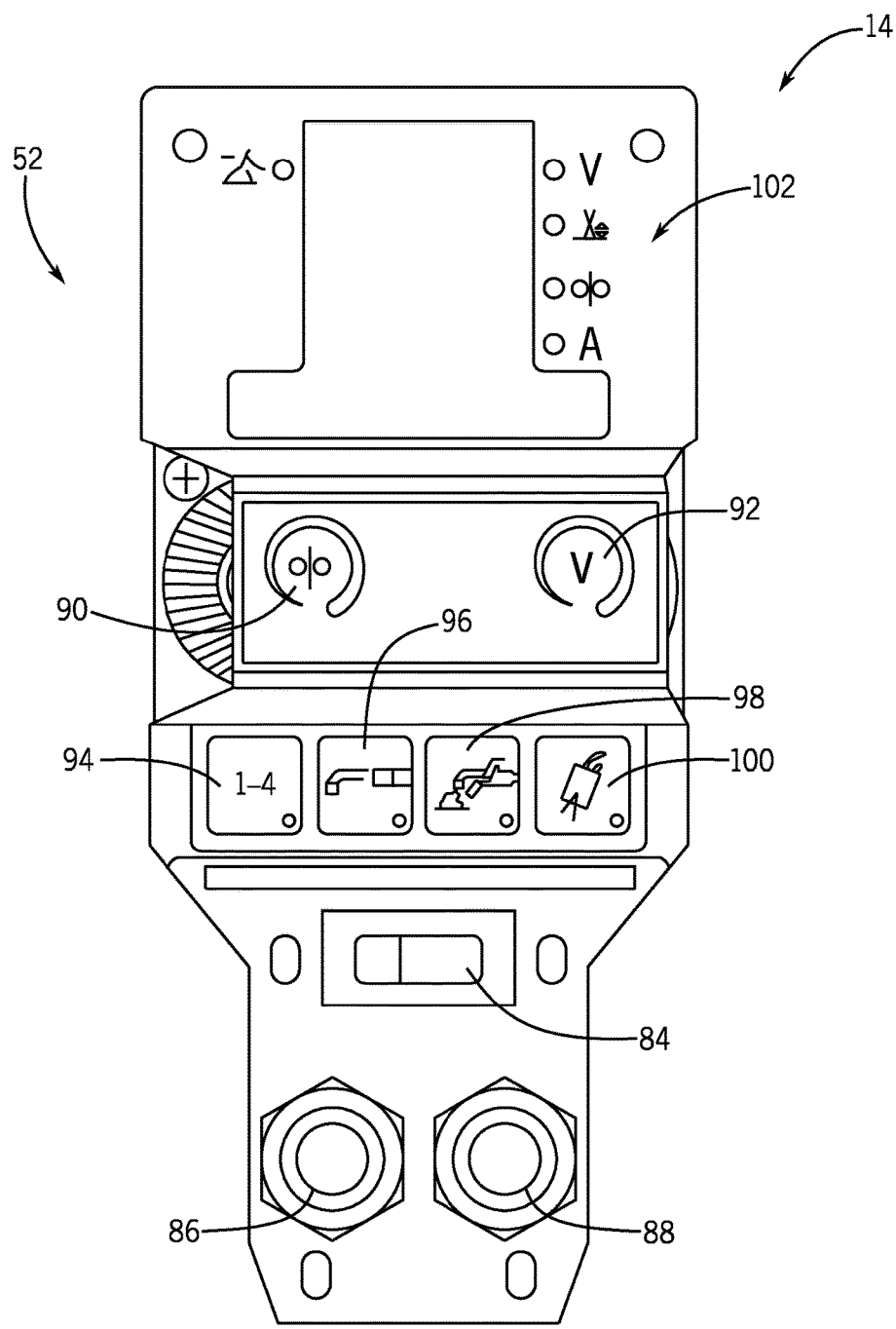
FIG. 2 is a front view of an embodiment of a user interface of a voltage sensing wire feeder, in accordance with aspects of the present disclosure.

FIG. 2 is a front view of an embodiment of the user interface 52 of the voltage sensing wire feeder 14. The user interface 52 includes a power switch 84 for powering on/off the voltage sensing wire feeder 14. The user interface 52 also includes a connector 86 for coupling the voltage sense cable 80, and a connector 88 for coupling to a welding torch trigger connector. Moreover, the user interface 52 includes a wire speed control 90 and a voltage control 92 that enable an operator to adjust respective settings of the voltage sensing wire feeder 14.

The user interface 52 also includes selectors 94, 96, 98, and 100 for selecting various settings that correspond to a welding application. The selectors 94, 96, 98, and 100 may be buttons, switches, touch screens, and so forth. Moreover, the selectors 94, 96, 98, and 100 may be used to select a weld procedure memory, a welding process (e.g., stick, tungsten inert gas (TIG), MIG, etc.), a trigger hold option (e.g., when enabled a welding torch trigger may be held as if in a depressed state without actually depressing the welding torch trigger), and/or a gas purge selection (e.g., to control shielding gas to flow through the welding torch to prepare the welding torch for a welding application). In certain embodiments, an operator may depress the selector 94 a number of times until a desired weld procedure memory is selected. For example, the selector 94 may enable selection of 1, 2, 3, 4, 5, 10, 20, or more weld procedure memories. In other embodiments, the user interface 52 may include individual selectors that each only select one weld procedure memory. The user interface 52 includes indicators 102 to indicate the status of various parameters of the voltage sensing wire feeder 14. For example, the indicators 102 may indicate a voltage mode, a current mode, a voltage, a current, and so forth.

Figure 3:
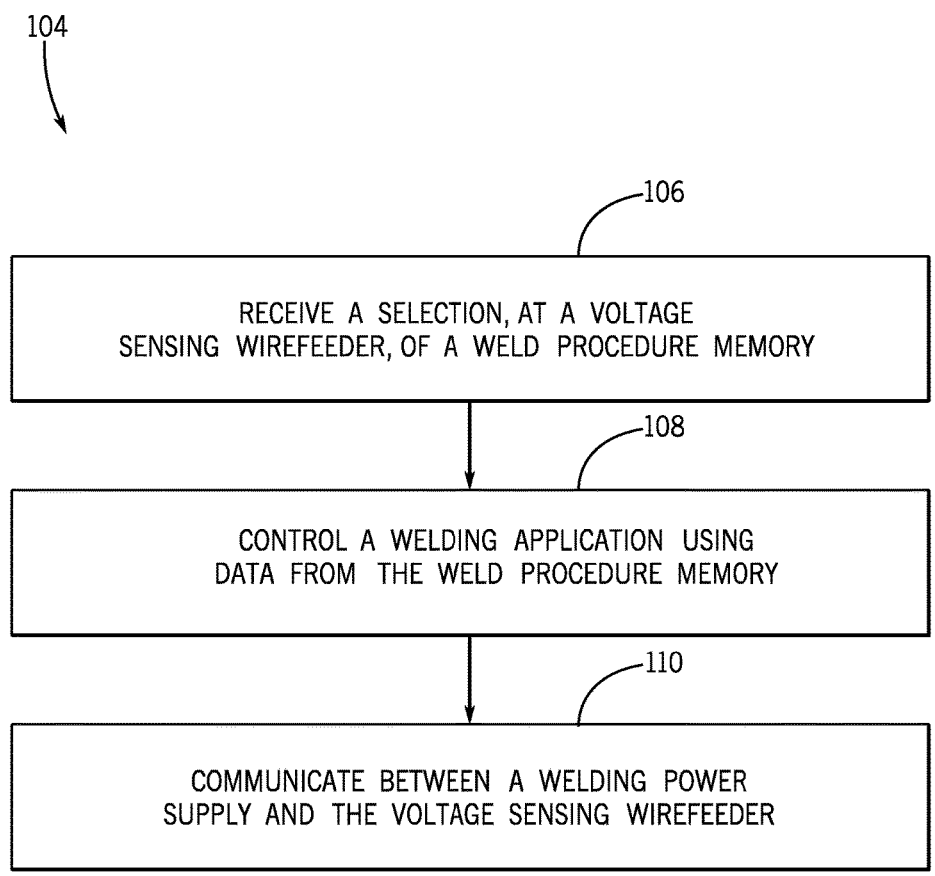
FIG. 3 is a flow chart of an embodiment of a method for using a weld procedure memory of a voltage sensing wire feeder, in accordance with aspects of the present disclosure.

FIG. 3 is a flow chart of an embodiment of a method 104 for using a weld procedure memory of the voltage sensing wire feeder 14. At block 106, the voltage sensing wire feeder 14 receives a selection of a weld procedure memory. The weld procedure memory is selected from multiple weld procedure memories stored on the voltage sensing wire feeder 14. The weld procedure memory may include one or more of a wire feed speed, a power supply voltage setting, a power supply current setting, a welding process setting, a welding sequence, and so forth. At block 108, the voltage sensing wire feeder 14 controls a welding application using data from the weld procedure memory. Moreover, at block 110, the welding power supply 12 and the voltage sensing wire feeder 14 communicate together to coordinate control of the welding application. In certain embodiments, the welding power supply 12 and the voltage sensing wire feeder 14 may communicate by providing data together with welding power over a weld cable electrically coupled between the voltage sensing wire feeder 14 and the welding power supply 12. Moreover, in some embodiments, the welding power supply 12 and the voltage sensing wire feeder 14 may communicate wirelessly, using a network interface, using a gas interface, and so forth.

As described herein, the voltage sensing wire feeder 14 may include one or more weld procedure memories. Furthermore, the voltage sensing wire feeder 14 may be configured to communicate with the welding power supply 12 to perform welding applications corresponding to the weld procedure memories without using a dedicated power/control cable (separate from the weld cable 40) coupled between the voltage sensing wire feeder 14 and the welding power supply 12. Accordingly, a number of cables extending between the welding power supply 12 and the voltage sensing wire feeder 14 may be kept to a minimal number, yet the voltage sensing wire feeder 14 may include features of a non-voltage sensing wire feeder (e.g., a constant speed wire feeder).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A voltage sensing wire feeder powered by welding power from a welding power supply provided via a weld cable, the voltage sensing wire feeder comprising:
    a voltage sensing lead configured to electrically couple the voltage sensing wire feeder to a workpiece connection;
    a contactor configured to transmit or prevent the welding power from the voltage sensing wire feeder to a welding torch;
    a memory device storing a first weld procedure memory comprising a first group of operational settings and a second weld procedure memory comprising a second group of operational settings;
    a user interface configured to receive user desired selection of one of the first weld procedure memory or the second weld procedure memory; and
    wire feeder control circuitry configured to:
        control operation of the contactor and a wire feed speed of the voltage sensing wire feeder based on the first group of operational settings and to provide the welding power supply with a first voltage output setting when the first weld procedure memory is selected; and
        control operation of the contactor and the wire feed speed the voltage sensing wire feeder based on the second group of operational settings and to provide the welding power supply with a second voltage output setting when the second weld procedure memory is selected,
        wherein the operational settings provided to the welding power supply are provided as a data signal over the welding power on a same electrical conductor of the weld cable.

2. The voltage sensing wire feeder of claim 1, wherein the voltage sensing wire feeder and the welding power supply are configured to communicate with one another over the weld cable via weld cable communication (WCC).

3. The voltage sensing wire feeder of claim 1, wherein the wire feeder control circuitry is configured to receive combined welding power and data from the welding power supply, and to provide combined welding power and data to the welding power supply, wherein the combined welding power and data enables communication between the voltage sensing wire feeder and the welding power supply for using the first group of operational settings, the second group of operational settings, or any combination thereof.

4. The voltage sensing wire feeder of claim 1, wherein the user interface comprises an input device configured to receive the user desired selection of the first weld procedure memory or the second weld procedure memory.

5. The voltage sensing wire feeder of claim 1, wherein the first group of operational settings or the second group of operational settings comprises a power supply voltage setting, a power supply current setting, a power supply type setting, a power supply configuration setting, a system configuration setting, an arc control setting, a welding process setting, a welding sequence, or any combination thereof.

6. The voltage sensing wire feeder of claim 1, wherein the first weld procedure memory or the second weld procedure memory comprises data corresponding to a process, a sequence, or any combination thereof that enables the welding power supply and the voltage sensing wire feeder to work together.

7. The voltage sensing wire feeder of claim 6, wherein the data corresponding to the process, the sequence, or any combination thereof comprises a voltage setting, a current setting, a wire speed, a time, or any combination thereof.

8. The voltage sensing wire feeder of claim 6, wherein the first weld procedure memory or the second weld procedure memory comprises data corresponding to a process, wherein the process comprises flux-cored arc welding (FCAW) no shielding gas, metal inert gas (MIG) with shielding gas, FCA W with shielding gas, pulsed MIG, stick 6010, stick 7108, lift arc tungsten inert gas (TIG), scratch start TIG, air carbon arc gouging (ACAG), remote lift arc TIG, or any combination thereof.

9. The voltage sensing wire feeder of claim 1, wherein the voltage sensing wire feeder is coupled to the welding power supply by the weld cable and a voltage sense cable, wherein the voltage sense cable is the voltage sensing lead.

10. A voltage sensing wire feeder powered by welding power from a welding power supply, the voltage sensing wire feeder comprising:
   a voltage sensing lead configured to electrically couple the voltage sensing wire feeder to the welding power supply via a workpiece connection;
   a contactor configured to transmit or prevent the welding power from the voltage sensing wire feeder to a welding torch;
   a memory device storing a plurality of weld procedure memories each comprising operational settings;
   a user interface configured to receive a user selection of a desired one of the weld procedure memories; and
   wire feeder control circuitry powered by weld power received over a weld cable, the wire feeder control circuitry being configured to:
      control operation of the contactor and a wire feed speed of the voltage sensing wire feeder based on the operational settings of the desired weld procedure memory; and
      provide the welding power supply with at least one operational setting for the desired weld procedure memory,
      wherein the operational setting provided to the welding power supply is provided as a data signal over the welding power on a same electrical conductor of the weld cable.

11. The voltage sensing wire feeder of claim 10, wherein the wire feeder is configured to communicate, via weld cable communication (WCC), data related to control of a welding application based on one of the weld procedure memories.

12. The voltage sensing wire feeder of claim 10, wherein the wire feeder is electrically coupled to the welding power supply by the weld cable and a voltage sense cable, wherein the voltage sense cable is the voltage sensing lead.

13. The voltage sensing wire feeder of claim 10, wherein the wire feeder comprises a first connector configured to couple to a voltage sense cable and a second connector configured to couple to a welding torch trigger connector.

14. The wire feeder of claim 10, wherein the voltage sensing wire feeder provides the welding power supply with a power supply voltage setting, a power supply current setting, a power supply type setting, a power supply configuration setting, a system configuration setting, an arc control setting, a welding process setting, a welding sequence, or any combination thereof as the operational setting provided to the welding power supply.

15. A voltage sensing wire feeder powered by welding power from a welding power supply provided via a weld cable, the voltage sensing wire feeder comprising:
   a voltage sensing connector configured to couple to a voltage sensing lead that electrically couples the voltage sensing wire feeder to the welding power supply via a workpiece connection;
   a contactor configured to transmit or prevent the welding power from the voltage sensing wire feeder to a welding torch;
   a memory device storing a first weld procedure memory comprising a first plurality of operational settings and a second weld procedure memory comprising a second plurality of operational settings;
   a user interface configured to receive a user desired selection of one of the first weld procedure memory or the second weld procedure memory, wherein the first weld procedure memory is selected via a selector actuated a first quantity of times and the second weld procedure memory is selected via the selector actuated a second quantity of times; and
   wire feeder control circuitry configured to:
      control operation of the contactor and a wire feed speed of the voltage sensing wire feeder based on the first plurality of operational settings and to provide the welding power supply with a first voltage output setting when the first weld procedure memory is selected; and
      control operation of the contactor and the wire feed speed the voltage sensing wire feeder based on the second plurality of operational settings and to provide the welding power supply with a second voltage output setting when the second weld procedure memory is selected,
      wherein the operational settings provided to the welding power supply are provided as a data signal over the welding power on a same electrical conductor of the weld cable.

16. The voltage sensing wire feeder of claim 15, wherein the voltage sensing wire feeder comprises a first connector configured to couple to a voltage sense cable and a second connector configured to couple to a welding torch trigger connector.

17. The voltage sensing wire feeder of claim 15, wherein the user interface enables selection of the first weld procedure memory and the second weld procedure memory by actuating the selector until a desired weld procedure memory is selected.

18. The voltage sensing wire feeder of claim 15, wherein the first weld procedure memory or the second weld procedure memory comprises a power supply voltage setting, a power supply current setting, a power supply type setting, a power supply configuration setting, a system configuration setting, an arc control setting, a welding process setting, a welding sequence, or any combination thereof.

19. The voltage sensing wire feeder of claim 15, wherein the user interface comprises a second selector to select a welding process, a third selector to select a trigger hold option, and a fourth selector to select a gas purge selection.

20. A voltage sensing wire feeder powered by welding power from a welding power supply provided via a first weld cable between the voltage sensing wire feeder and the welding power supply, and the voltage sensing wire feeder comprising:
- a voltage sensing connector configured to couple to a voltage sensing lead that electrically couples the voltage sensing wire feeder to the welding power supply via a workpiece connection;
- a contactor configured to transmit or prevent the welding power from the voltage sensing wire feeder to a welding torch;
- a welding torch connector configured to couple to a second welding cable of a welding torch;
- a memory device storing a first weld procedure memory comprising a first plurality of operational settings and a second weld procedure memory comprising a second plurality of operational settings;
- a user interface configured to receive a user desired selection of one of the first weld procedure memory or the second weld procedure memory, wherein the first weld procedure memory is selected via a selector actuated a first quantity of times and the second weld procedure memory is selected via the selector actuated a second quantity of times; and
- voltage sensing wire feeder control circuitry configured to
  - control operation of the contactor and a wire feed speed of the voltage sensing wire feeder based on the first plurality of operational settings and to provide the welding power supply with a first voltage output setting when the first weld procedure memory is selected; and
  - control operation of the contactor and the wire feed speed of the wire feeder based on the second plurality of operational settings and to provide the welding power supply with a second voltage output setting when the second weld procedure memory is selected, and
- wherein the operational settings provided to the welding power supply are provided as a data signal via a wireless transceiver of the wire feeder.

21. The voltage sensing wire feeder of claim 1, wherein the workpiece connection forms an electrical circuit between the welding power supply through the welding cable, the voltage sensing lead between the wire feeder and a workpiece, and a work cable from the workpiece to the welding power supply.

* * * * *